ated Feb. 5, 1918.
UNITED STATES PATENT OFFICE.

CARLETON ELLIS, OF MONTCLAIR, NEW JERSEY.

CATALYZER AND PROCESS OF MAKING SAME.

1,255,590. Specification of Letters Patent. Patented Feb. 5, 1918.

No Drawing. Application filed September 21, 1916. Serial No. 121,494.

*To all whom it may concern:*

Be it known that I, CARLETON ELLIS, a citizen of the United States, residing at Montclair, in the county of Essex and State of New Jersey, have invented certain new and useful Improvements in Catalyzers and Processes of Making Same, of which the following is a specification.

The present invention relates to catalysis by the use of salts or compounds of certain metals or metalloids, and is especially applicable to hydrogenation of oily and similar bodies.

In the preferred form of my present invention, a composition containing nickel and boron is produced which is suitable for use as a hydrogenating catalyst, e. g. in the hydrogenation of oils. This material for example may be prepared as follows: A solution of caustic alkali is treated with hydrid of boron, and the resulting product is treated with a nickel salt. This produces material containing borid of nickel suitable for use as a catalyst.

In the preparation of this catalyst, compounds of other metals besides nickel can be employed, such as cobalt, copper and the like, or mixtures of compounds of such metals may be employed.

In using these bodies as catalysts, they may be used alone, or they may be supported upon suitable carriers, or they may be associated with materials which also aid in the catalysis to be effected.

These bodies will preferably be used in the catalytic process for which they are intended, without first being brought into contact with atmospheric air. In this manner, their high state of activity is preserved, and their period of activity (longevity) extended.

In my application 686,988, filed March 29, 1912 (renewed September 11, 1916, as Serial No. 119,408 now Patent 1,217,118) I have also described the use of compounds of nickel, copper, iron, platinum, cobalt, chromium, manganese, titanium, molybdenum, vanadium, in the form of their oxids, carbids, or silicids, particularly in colloidal form, suspended or carried in an oily vehicle.

Such compounds may be employed in a colloidal condition, alone or in admixture with each other, and if desired, these materials may be carried upon or associated with suitable active or inactive bodies or supports, among the active agents being mentioned carbon in various forms, and particularly graphite in a deflocculated state, or other deflocculated carbon.

As examples, granular or other charcoal may be used as a support or coöperating agent for such catalysts, and in some cases inert bodies such as pumice, infusorial earth, asbestos, etc., give good results when used as supporting agents.

The above mentioned catalytically acting bodies may be precipitated *in situ* upon the charcoal or other base or on an inert carrier, or they may be applied thereto, after being first produced. It is desirable, when using charcoal as a secondary catalyst and also as a carrier, not to too deeply impregnate the same, but to produce the same as a thin superficial layer thereupon.

In some cases, the reaction vessel may be lined with one or another of the catalytic materials specified, or with a plurality of such.

In the preparation of these catalytically active compounds, it is preferable to prevent access of air or other oxidizing gases thereto. This is particularly the case when using compounds of such metals with solid metalloid elements, particularly such compounds as silicids, carbids, borids, etc., when in a colloidal or other extremely finely-divided state. Owing to the immense amount of surface possessed by a unit weight of such colloidal catalyst, it would readily be more or less completely oxidized by the action of air, and such uncontrolled oxidation of these compounds usually tends to greatly reduce their catalytic activity. The compounds mentioned have, in many hydrogenation reactions, a more satisfactory catalytic action than the oxids.

As a highly effective mode of sealing these catalysts, I cite the use of melted hydrocarbon, such as a paraffin wax, although for many purposes it is advisable to seal the catalyst in some of the material with which such catalyst is to be employed.

I do not claim specifically catalysts containing nickel and silicon, such subject matter being claimed in my copending applications 115,113 filed Aug. 15, 1916 and 873,507 filed Nov. 23, 1914.

What I claim is:—

1. A catalyst comprising a compound of a catalytically active substance with a solid metalloid element, such compound being in a catalytically active state; and being capable of use as a hydrogen carrier, said material being carried in a non-aqueous organic vehicle.

2. A catalyst for hydrogenation, comprising a substantially non-oxidized catalytically active compound of a catalytic non-noble metal, said compound being sealed from the air.

3. A catalyzer comprising a substantially non-oxidized, catalytically active chemical compound of a catalytic non-noble metal deposited upon and carried by a suitable base.

4. A process which comprises producing a catalytically active compound of a solid metalloid element and a catalytic metal, and without previous free exposure of such compound to air subjecting an organic substance to be hydrogenated to hydrogen while in the presence of such compound.

5. An active base carrying an active substantially non-oxidized catalytic chemical compound of a metal.

6. In the preparation of catalysts, the step of producing a catalytically active non-oxidized chemical compound of a metal, and without exposure to air, sealing the same in a vehicle not readily permeable to air.

7. Nickel borid sealed in oily material.

8. A catalyzer including as a constituent thereof, a metal which is capable in the free state of inducing the chemical affixation of hydrogen to unsaturated organic materials, said metal being in a non-oxidized state and being sealed in paraffin wax.

9. A material containing a catalytic body comprising a solid metalloid element united to a metal which in the free state is capable of inducing the chemical affixation of hydrogen to unsaturated organic bodies, said catalytic body being sealed in paraffin wax.

In testimony whereof I affix my signature.

CARLETON ELLIS.